(12) United States Patent
Hall et al.

(10) Patent No.: US 7,708,082 B2
(45) Date of Patent: May 4, 2010

(54) FIRE FIGHTING BUCKET SUSPENDABLE FROM AIRCRAFT

(75) Inventors: Geoff Hall, Essendon Airport (AU); Mark Robertson, Essendon Airport (AU)

(73) Assignee: Absolute Fire Solutions Limited, Alberta (CA)

( * ) Notice: Subject to any disclaimer, the term of this patent is extended or adjusted under 35 U.S.C. 154(b) by 976 days.

(21) Appl. No.: 10/526,852

(22) PCT Filed: Sep. 4, 2003

(86) PCT No.: PCT/AU03/01141

§ 371 (c)(1),
(2), (4) Date: Sep. 26, 2005

(87) PCT Pub. No.: WO2004/022426

PCT Pub. Date: Mar. 18, 2004

(65) Prior Publication Data

US 2006/0097112 A1  May 11, 2006

(30) Foreign Application Priority Data

Sep. 4, 2002 (AU) .............................. 2002951225

(51) Int. Cl.
*A62C 25/00* (2006.01)

(52) U.S. Cl. ........................ 169/53; 139/171; 244/136
(58) Field of Classification Search .................. 169/53; 239/171; 244/129.2, 136; 222/57
See application file for complete search history.

(56) References Cited

U.S. PATENT DOCUMENTS

| | | | | |
|---|---|---|---|---|
| 3,661,211 A | * | 5/1972 | Powers | 169/53 |
| 3,828,857 A | * | 8/1974 | Mason | 169/53 |
| 4,240,507 A | * | 12/1980 | Hokkanen | 169/53 |
| 4,601,345 A | | 7/1986 | Mahrt | |
| 5,320,185 A | | 6/1994 | Foy et al. | |
| 5,560,429 A | * | 10/1996 | Needham | 169/53 |

FOREIGN PATENT DOCUMENTS

| | | |
|---|---|---|
| GB | 1556107 | 11/1979 |
| JP | 8217189 A | 8/1996 |

* cited by examiner

*Primary Examiner*—Dinh Q Nguyen
(74) *Attorney, Agent, or Firm*—McGlew and Tuttle, P.C.

(57) ABSTRACT

Firefighting bucket (11) suspended from an aircraft by lines (15), has open top (12A) and a valve at base (13). The valve is attachable to the aircraft by remotely actuatable line (16) and independent movement of lines (15-16) may utilise the weight of the water to facilitate opening and closing of the valve. Dynamic sensing of a bucket attribute, e.g. weight, enables bucket (11) to be filled or discharged by a pre-determined volume by the pilot. Chemical fire retardant may be added by entraining it with water discharging from the valve.

17 Claims, 6 Drawing Sheets

FIRE FIGHTING BUCKET SUSPENDABLE FROM AIRCRAFT

FIELD OF THE INVENTION

The present invention is directed to improvements in or relating to fire fighting apparatus, and is more particularly directed to buckets which are capable of being suspended from aircraft for dumping water on forest fires.

BACKGROUND OF THE INVENTION

In this specification, where a document, act or item of knowledge is referred to or discussed, this reference or discussion is not an admission that the document, act or item of knowledge or any combination thereof was at the priority date:
(i) part of common general knowledge; or
(ii) known to be relevant to an attempt to solve any problem with which this specification is concerned.

Fire fighting buckets carried by an aircraft such as a helicopter are well-known, and have been used with success in controlling fires in many countries including Australia, the United States and Canada.

In general, a bucket of this nature is suspendible from a helicopter by a sling or harness and, by virtue of its open-topped and closed bottom construction, is capable of being filled with water from an available water source such as a lake, dam, river or ocean by the lowering of the bucket into the water source. When filled, the bucket is raised and the pilot transports the bucket to the site of the fire, following which the water is discharged onto the fire by remote activation by the pilot of a valve in or near the region of the base of the bucket.

Typical examples of such buckets can be found in the disclosures in U.S. Pat. Nos. 3,661,211, 4,474,245, 4,576,287 and 5,560,429.

U.S. Pat. No. 3,661,211 for example discloses a flexible open-topped bucket having a pair of pneumatic-ram operated doors which open upwardly to release the contents of the bucket. The ram-operated doors are in the form of a 'plunger-type' valve or 'gate' valve operated by a fluid-operated ram connected to a pressurized fluid source in the helicopter.

Because the valves are typically hydraulically or electrically actuated, they are heavy and prone to failure. The nature of this arrangement is also such that it is capable of only a single water drop, which only enables a fixed amount of water to be dumped on the fire, and necessitates more frequent returns by the pilot to the water source to refill the bucket.

If a fire is raging in a remote location with restricted or no access to a readily available source of water, this will naturally increase the number of trips the pilot has to make back and forth from the fire to the water source.

This can severely impact on the effectiveness of this firefighting technique, and also increases the cost of the helicopter being in the air, the potential risk to the pilot through fatigue, the possibility of equipment failure, greater use of fuel and so on.

It will be understood that dumping a fixed amount of water on a fire which may only require a fraction of the fixed amount in order to be effective, is an inefficient use of this resource, and may lead to a different but no less harmful type of damage to the environment.

The disclosures in U.S. Pat. Nos. 4,474,245, 4,576,287 and 5,560,429 describe a flexible bucket where the 'plunger-type' valve is replaced with a 'sleeve-type' dump valve. A tubular extension made of the same pliable material as the bucket extends from an opening in the bottom of the bucket to a free end formed with a discharge port to serve as a dump valve. The discharge port has a circumferential sealing lip made of soft resilient material which forms two opposite lip portions that are brought into sealing engagement with each other to minimize water leakage from the tubular extension when the sleeve is held raised within the bucket.

To dump the water, the sleeve is released by loosening purse lines by a release mechanism, causing the sleeve to fall quickly through the opening in the bottom of the bucket. The lip portions are opened simultaneously under the weight of the water, permitting a rapid discharge of the water. This type of bucket arrangement is typically referred to in the industry as a Bambi Bucket™.

Although buckets of that configuration are said to have been very successful, the sleeve-type dump valve is a single action valve whereby the bucket releases all of its load in a single discharge. Accordingly, it cannot be closed during discharge to allow for a second discharge at a remote location. This again leads to inefficient use of water and helicopter time, necessitating more frequent visits to the water source to fill the bucket.

In addition, the relatively soft sealing material of the lip portions of the discharge port can wear rapidly after many deployments of the valve due to the abrasion of the purse lines. The wear is likely to result in loss of sealing effectiveness and resultant leakage through the dump valve.

One attempt at addressing this problem is disclosed in U.S. Pat. No. 5,829,809, which is said to permit the discharge of two separate loads from a single filling of the bucket by having an outer bucket with an outer sleeve-type dump valve and an inner bucket with an inner sleeve-type dump valve, the inner bucket being located within the outer bucket.

Such an arrangement is however likely to suffer from ineffective filling of both buckets because the inner bucket rests inside the outer bucket. In addition, as observed above, the relatively soft sealing material of the lip portions of the discharge port can wear rapidly after many deployments of the valve due to the abrasion of the purse lines. The wear is likely to result in loss of sealing effectiveness and resultant leakage through the dump valve.

There is also some risk of tangling of the purse lines.

A further problem with prior art buckets described above is that the bucket load can only be controlled manually by means of a cinch strap. This strap passes circumferentially around a portion of the bucket approximately midway and passes through a plurality of loops provided on the inner surface of the side wall. The load in the bucket is controlled by varying the tightness of the strap. This requires the helicopter pilot to land the helicopter and tighten or loosen the cinch strap manually. It is time consuming, and necessitates the pilot having to find suitable terrain on which to land, leading to increased risk to the pilot.

Zipper or slide fasteners in the side walls of the bucket in order to control the magnitude of the load being carried have been proposed as an alternative to the cinch strap—see for example U.S. Pat. No. 3,661,211. Zipper fasteners however suffer from the same disadvantage as cinch straps—they require the pilot to engage in a manual manipulation of the fasteners on the ground.

U.S. Pat. No. 6,192,990 discloses a valve which is said to permit the discharge of multiple separate loads from a single filling of the bucket. The valve comprises an inner assembly of a top plate and a bottom plate and an outer assembly of a solid side wall that forms a cylinder shape with the top and bottom plates. When the valve is in a dosed position, respective upper and lower portions of the side wall make a sealing engagement with the top and bottom plates. The valve is opened by moving the side wall in an upwards direction away from the plates, with the water flowing into the open sides of the valve and out of an opening in the bottom plate. Similarly, the valve is dosed by moving the side wall back into sealing engagement with the top and bottom plates. The valve can be dosed before the bucket is emptied to permit the discharge of multiple loads.

Upwards movement of the side wall is achieved by a mechanical actuator that is controlled by the helicopter pilot from the cockpit. Downward movement of the sidewall may also be provided by the mechanical actuator, as well as by the weight of the water in the bucket and/or other means such as a tension spring. The valve may also be partially opened to control the rate of flow from the bucket by varying the distance of movement of the side wall away from the top and bottom plates, which may be monitored by position sensors.

The valve of U.S. Pat. No. 6,192,990 suffers from a number of disadvantages. Principally, it requires a heavy and expensive motorised actuator to open the valve.

SUMMARY OF THE INVENTION

The present invention provides in one embodiment a fire fighting apparatus comprising:
(a) a bucket capable of being suspended from an aircraft, the bucket having an open upper end to enable the bucket to be filled with a fire retardant such as water, and
(b) a valve located in the region of the base of the bucket for permitting a controlled volume of the bucket load to be discharged remotely by the aircraft pilot, the valve being attachable to the aircraft by at least one remotely actuatable valve line, stay or cable that is not otherwise attached to the bucket, and at least one separate remotely actuatable bucket line, stay or cable that is not otherwise attached to the valve is provided for attaching the bucket to the aircraft, wherein the bucket and the valve are selectively movable relative to one another on independent actuation of the stays to facilitate opening or closing of the valve.

The use of separate lines, stays or cables for the bucket and for the valve allows for independent relative movement of the bucket with respect to the valve and vice versa.

In a filling or transport phase, the valve stay and the bucket lines will typically be held in a fixed position relative to one another. This may be achieved by appropriate operation of an actuator.

In a bucket discharge phase, the bucket lines are slackened or extended remotely by the pilot so that the bucket falls relative to the valve. By virtue of the fixed position of the valve in space relative to the bucket and by virtue of the tapering of the bucket, a gap forms between the outer periphery of the valve and a side wall of the bucket. The weight of the water which starts to pass through the gap has the effect of distorting the valve periphery, and is thought to create an effect approximating a venturi effect in the region between the valve periphery and a side wall of the bucket.

In an alternative arrangement, in a bucket discharge phase, the valve stay is shortened so that the valve is drawn upwardly relative to the bucket. By virtue of the fixed position of the bucket in space relative to the valve and by virtue of the tapering of the bucket, a gap forms between the outer periphery of the valve and a side wall of the bucket. The weight of the water which starts to pass through the gap has the effect of distorting the valve periphery, creating an effect approximating a venturi effect in the region between the valve periphery and a side wall of the bucket.

Correspondingly, as the level, and hence the weight, of water in the bucket subsides, the valve periphery will generally become less distorted, leading to a lower rate of discharge through the gap between the valve periphery and a side wall of the bucket. Eventually the valve will be caused to return to its rest configuration when the discharge phase is terminated either by adjustment of the bucket relative to the valve or when the bucket is drained of water.

Control of the discharge from the bucket may accordingly be achieved by remote tensioning or slackening of the cables, lines or stays attached to the bucket or to the valve. This is typically achieved by an actuator.

The actuator will typically be operable from the aircraft by the pilot. In one typical embodiment the actuator may include a hydraulic cylinder arrangement that utilises the weight of the water to apply a force to selectively move the valve between a dosed position and an open position permitting a volume of liquid to be discharged through a gap between the valve and the bucket wall.

The actuator is preferably located in a region which is remote from the wet area of the bucket. The actuator will typically be attached to cable supports for the bucket, which then connects the actuator directly to the suspension hook of the aircraft or to an extension long line.

Typically there will be a plurality of electric solenoids to control the valve in the open or dosed sequence. The arrangement may be such as to include a manual override function so as to release water in the event of an electrical or other failure.

In one typical embodiment the hydraulic cylinder arrangement includes a weight bearing cylinder connected to the bucket wall, a valve opening cylinder connected to the bucket base, means for temporarily reducing the weight held by the weight bearing cylinder and means for transferring a hydraulic fluid from the weight bearing cylinder to the valve opening cylinder in response to the temporary reduction in weight, wherein the transferred hydraulic fluid causes the valve opening cylinder to apply the force to bend the leaves from the dosed position to the open position.

Typically, the volume of the weight bearing cylinder is greater than the volume of the valve opening cylinder. This allows for a greater mechanical advantage to be obtained when the hydraulic fluid is transferred from the load bearing cylinder to the valve opening cylinder.

Preferably the apparatus includes an extendible line connecting the weight bearing cylinder to the bucket, from which the bucket may be allowed to fall a predetermined distance, thereby temporarily reducing the weight held by the weight bearing cylinder.

The valve opening cylinder generally includes a rod that is retracted by the transferred hydraulic fluid, thereby applying the force to bend the leaves from the dosed position to the open position.

Preferably the hydraulic cylinder arrangement further includes a reset cylinder for transferring hydraulic fluid to the weight bearing cylinder after the bucket has been emptied. The reset cylinder may employ a compression spring to transfer the hydraulic fluid to the weight bearing cylinder.

The present invention provides in a separate embodiment a fire fighting apparatus comprising:
(a) a bucket capable of being suspended from an aircraft, the bucket having an open upper end to enable the bucket to be filled with a fire retardant such as water;
(b) a valve located in the region of the base of the bucket for permitting the contents of the bucket to be discharged remotely by the aircraft pilot; and (c) sensing means to dynamically sense a bucket attribute to enable the bucket to be filled or discharged to a pre-determined volume by the pilot.

A particular advantage of this embodiment of the invention is that the pilot can control from his/her cockpit the amount of fire retardant the bucket is to be filled with. This gives the pilot a significant degree of flexibility in being able to use the bucket in most environments. It will be understood for example by those skilled in the art that at high altitudes where the air is thinner, a helicopter is less able to carry a full load than when near sea level. In a number of countries fires occur at quite high altitudes above sea level. The ability to control the volume of water the pilot picks up in the bucket means that this embodiment of the invention can be used effectively in environments that would otherwise provide severe limitations for prior art buckets.

The bucket attribute may be the level of water in the bucket or the weight of the bucket.

The valve and bucket of this embodiment may be as described herein.

Suitably the sensing means includes a pressure sensitive transducer that measures the pressure of hydraulic fluid associated with the apparatus, the pressure being directly proportional to the weight of the bucket. The sensing means may further include a variable voltage regulator adapted to receive a measurement of pressure from the transducer and control the opening and dosing of the valve, the variable voltage regulator closing the valve when the pressure falls below a predetermined level, thereby trapping a proportional weight of water in the bucket.

The present invention provides in another separate embodiment a fire fighting apparatus comprising:
(a) a bucket capable of being suspended from an aircraft, the bucket having an open upper end to enable the bucket to be filled with a fire retardant such as water;
(b) a valve located in the region of the base of the bucket for permitting the contents of the bucket to be discharged from the bucket remotely by the aircraft pilot; and
(c) a reservoir for a chemical fire retardant, the reservoir having release means which when activated permits the flow of retardant to the region of the underside of the valve where it becomes entrained with water being discharged through the valve.

This embodiment of the invention is predicated on the observation of a practice commonly adopted by operators of bucket-type fire fighting apparatus of adding a chemical fire retardant such as a foam to the inner walls of the bucket with a view to enhancing the effectiveness of this fire-fighting technique.

A potentially serious downside of this practice is the potential for the chemical fire retardant to contaminate the water source when the bucket is lowered in to the water source. This can have environmental consequences in damage to the waterway, surrounding flora and fauna, and to the communities which may use the water source for drinking and/or for recreation.

The advantage of this embodiment of the invention is that the inner side of the bucket does not become contaminated by the chemical retardant. Accordingly the bucket is significantly less likely to contaminate dip sites. This embodiment is predicated on the observation that the preferred valve construction of the invention enables the chemical retardant to become entrained with the water as the water flows from the bucket. As the water passes through the venturi throat created by the distortion of the valve, the pressure differential created by the venturi effect has been observed to draw retardant towards the flow path of the water being discharged.

The valve and bucket of this embodiment may be as described herein.

The reservoir may take any suitable form capable of holding a chemical fire retardant such as a foam, a liquid chemical retardant, or a gas. The reservoir will typically be located externally of the bucket. Preferably the reservoir will be capable of delivering the chemical retardant to the underside of the valve by a gravity feed.

The release means may take any suitable form. In one typical embodiment the release means comprises one or more valves. The valves will typically be solenoid valves or similar devices.

The apparatus of this embodiment may be provided with a sensor to sense the level or weight of water in the bucket. The sensor may in one embodiment comprise a pressure sensitive device which causes the valve to close when the bucket weight falls below a predetermined level set by the pilot. The pressure sensitive device may in one embodiment comprise a pressure sensing transducer capable of sensing the bucket weight and which allows the bucket to be filled automatically to a predetermined volume. The pilot's cockpit will typically be fitted with a visual or audible indicator to indicate to the pilot the volume level in the bucket.

In one typical embodiment of this aspect of the invention a switch is provided to restrict the flow of retardant from the reservoir when the bucket has been emptied to a predetermined level. The balance of the water remaining in the bucket may be used to dean the release means of retardant as the balance of the water is discharged onto a fire. A typical example provides for the discharge of approximately 75% of the water from the bucket, with the approximately 25% remaining being used to cleanse the release means.

The variable load capacity for the bucket provided by the invention may be achieved by observing that hydraulic pressure is directly proportional to the weight in the bucket. The hydraulic pressure may in one embodiment be measured by an electric transducer and passed to a variable voltage regulator and in turn a relay for valve open and valve closed operation. When hydraulic pressure (and therefore bucket weight) falls below a predetermined level selected by the pilot, the valve will be caused to dose, trapping that quantity of water in the bucket.

The variable load capacity for the bucket provided by the invention may be achieved by observing that hydraulic pressure is directly proportional to the weight in the bucket. The hydraulic pressure may in one embodiment be measured by an electric transducer and passed to a variable voltage regulator and in turn a relay for valve open and valve dosed operation. When hydraulic pressure (and therefore bucket weight) falls below a predetermined level selected by the pilot, the valve will be caused to dose, trapping that quantity of water in the bucket.

The aircraft may be a fixed wing aircraft or it may be rotor-driven. Typically the aircraft will be a helicopter.

The bucket according to the invention may take any suitable form. Typically the bucket will taper upwardly and outwardly so that the bucket has a relatively wide mouth as compared to the base of the bucket. This manner of construction has been observed to assist with maximising the efficacy of the scooping action of the bucket, and hence the amount of water the bucket can hold.

The bucket may be formed from any suitable material(s). Preferably, the bucket is formed from flexible material to enable it to be folded and stored (such as in an aircraft baggage compartment or in the cockpit) when not in use. In one typical embodiment the side walls of the bucket body are formed from a pliable substantially waterproof material. This construction not only contributes to the light weight of the bucket but also facilitates collapsing of the bucket vertically for storage. A typically preferred material for forming the side walls of the bucket is known as "Complas 900" having weldable webbing. The bucket may be provided with structural rigidity by releasable internal or external battens or spokes. The battens or spokes will typically collapse radially to approximately the diameter of the bucket base for transportation and storage. Preferably the base of the bucket will be substantially rigid.

The bucket may be suspended from the aircraft by any suitable means as is known in the art. This includes slings, cables, harnesses and cradles. The bucket will typically include hooks or other attachment points to facilitate suspension from the hook of the aircraft. Typically, the manner of suspension will be by means of one or more cables or harnesses forming a connection between the rim of the bucket body and a point of attachment on the aircraft. Preferably the supports will be distributed substantially evenly around the bucket rim to assist with the stability of the bucket during transportation by air. The supports will preferably be releasable for storage with the bucket when not in use.

The rim of the bucket may include one or more emergency attachment points to enable equipment or persons to be attached to the bucket and lifted out of a danger situation. The attachment points may be capable of having an attachment mechanism such as a carabina (often part of a fire or other safety worker's apparel) attached to them.

As an added safety feature of the invention, the base of the bucket, of which the valve forms a part, may in one embodiment have sufficient rigidity to support cargo, for example fire fighting equipment. The base may include a fail-safe device to ensure that the valve does not open when cargo is being carried inside the bucket.

The valve of the bucket located in the region of the base of the bucket for permitting the contents of the bucket to be discharged from the bucker may take any suitable form. The valve may be actuated by mechanical or electronic means. In a preferred embodiment opening and closing of the valve is achieved by relative movement of the bucket with respect to the valve and by the weight of water in the bucket as described herein.

Preferably the valve is capable of being distorted so as to produce a venturi effect, or an effect approximating a venturi effect, in part of the bucket. The arrangement is preferably such that a venturi throat is formed between a side wall of the bucket and the valve when the valve distorts under water pressure in a bucket discharge phase.

The valve will typically have at least one leaf capable of varying the state of the bucket base between an open and a closed condition.

In one embodiment the valve assembly comprises a valve body in the form of a substantially planar resiliently flexible disc mounted in a frame. In a particularly preferred embodiment, the valve body is in the form of a disc comprising a pair of leaves or wings capable of flexing about a substantially central hinging region. The leaves may be provided with one or more score lines, flex points, stress areas of reduced density, or lines of weakness to facilitate temporary distortion of the leaves and about which the leaves may bend when in an open condition to increase the gap between the leaves and the bucket wall.

In a preferred embodiment the leaves are capable of distorting in response to water pressure to permit a change of state of the valve.

The valve is in a preferred embodiment attached to the aircraft by means of a stay, line or cable. In a particularly preferred embodiment a substantially central stay is provided to support the valve, the central stay also being connected to the aircraft. The central stay is attachable to the valve by means of a pair of short stays which extend outwardly and downwardly from the central stay and are attached in the region of opposed peripheral edges of the valve.

The valve is accordingly capable of flexing upwardly or downwardly in response to a change in the weight of water in the bucket.

The valve body may be formed from any suitable material. In one typical embodiment the valve body is formed (such as by moulding) from a resilient polymer material or a mixture of polymer materials. One preferred polymer material is polyurethane. The polymer materials may have different densities. Other valve body materials are envisaged within the scope of the invention.

The valve frame may be formed from any suitable material. One preferred material is steel. A typical frame can be constructed in a preferred embodiment from a zinc plated mild steel.

The bucket base may be mounted in a rigid frame for preventing the valve periphery from flexing when in the dosed position. In one form of the invention to bucket base may comprise a central rigid region having first and second ends fixed to the bucket wall and a pair of leaves extending laterally from the central region to the bucket wall. On actuation the leaves may be selectively bent or flexed about the central region between a closed position wherein the periphery of the leaves make a sealing contact with the bucket wall and an open position wherein a portion of the leaves extend upwardly from the central region permitting a volume of liquid to be discharged through a gap between the leaves and the bucket wall.

In a typical embodiment of the invention the valve is capable of being remotely actuated by the pilot from the cockpit of the aircraft. Actuation of the valve may be by any suitable means. In one particularly preferred embodiment, the actuator comprises an electric over hydraulic system having a plurality of hydraulic cylinders and which uses the weight of the water in the bucket to store energy and to use that energy (in effect, gravity) to release the water on command. The hydraulic cylinders do not require hydraulic pumps, electric motors or bleed air in order to function. A nitrogen accumulator will typically be used to reset the cylinders before the bucket is refilled.

The apparatus of the present invention allows the pilot to automatically and accurately adjust, from the cockpit, the amount of water being lifted in flight. This obviates the need to land the aircraft and make manual adjustments to the bucket. This not only improves safety but allows the aircraft to remain "on fire" longer as more fuel can be loaded initially. As fuel burns off more water can be added to the bucket.

The present invention provides in another separate embodiment a fire fighting apparatus comprising:

(a) a tapered bucket capable of being suspended from an aircraft, the bucket having a bucket wall, an open upper end to enable the bucket to be filled with a fire retardant such as water, and a bucket base comprising a pair of leaves or wings capable of flexing about a substantially central hinging region; and (b) an actuator operable from the aircraft, the actuator including a hydraulic cylinder arrangement that utilises the weight of the water to apply a force to selectively flex the leaves about the hinging region between a dosed position wherein a periphery of the leaves make a sealing contact with the bucket wall and an open position wherein a portion of the leaves extend upwardly from the hinging region permitting a volume of water to be discharged through a gap between the leaves and the bucket wall.

The hydraulic cylinder arrangement may include a weight bearing cylinder connected to the bucket wall, and a valve opening cylinder connected to the bucket base, means for temporarily reducing the weight held by the weight bearing cylinder and means for transferring a hydraulic fluid from the weight bearing cylinder to the valve opening cylinder in response to the temporary reduction in weight, wherein the transferred hydraulic fluid causes the valve opening cylinder to apply a force to flex the leaves from the dosed position to the open position.

The present invention in its various embodiment provides a number of advantages over the prior art arrangements noted above. In particular, it provides a compact, lightweight and simple valve opening arrangement that does not require hydraulic pumps, electric motors or bleed air in order to function. The valve can also be repeatably opened or dosed during transportation of a single bucket load to permit a fire retardant, usually water, to be discharged from the bucket at multiple sites of a fire.

DESCRIPTION OF THE DRAWINGS

The present invention will now be further described with reference to particularly preferred embodiments in which.

DETAILED DESCRIPTION OF THE INVENTION

Figure 1:
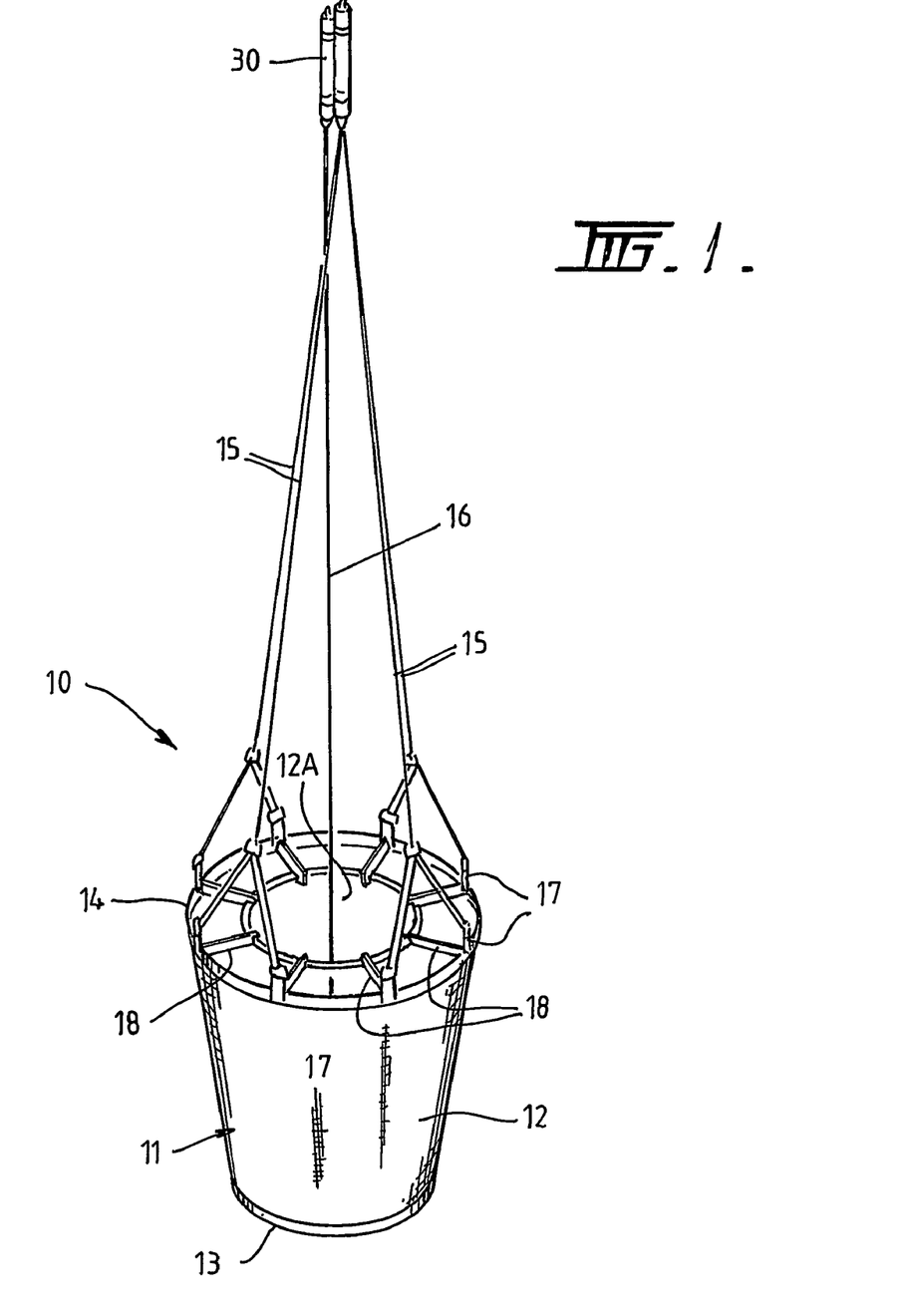
FIG. 1 is a perspective view from above of a fire fighting apparatus according to one embodiment of the invention.

Turning to the drawings, FIG. 1 shows a fire fighting apparatus 10 in the form of a tapered bucket 11 having a bucket wall 12, an open upper end 12A, a bucket base 13 and a rim 14. Attachment points 17 are provided around the rim 14 to facilitate attachment of the bucket 11 to an aircraft (not shown). The preferred embodiment of the fire fighting apparatus includes a foam tank which is not illustrated in FIG. 1 for reasons of clarity. The foam reservoir is described and illustrated in detail below.

The bucket 11 is capable of being suspended from an aircraft such as a helicopter (not shown) by means of lines 15 connecting the bucket to an attachment point (also not shown) such as a sling hook on a helicopter.

The bucket 11 is capable of holding a definable volume of water to be transported to the site of a forest fire for discharge. The bucket 11 may be of any suitable shape including a cylindrical shape or, as in the embodiment shown, a frusto-conical shape tapering upwardly and outwardly.

The bucket wall 12 is constructed from a flexible substantially water-proof material such as Complas 900™. Weldable webbing reinforces the Complas for vertical and horizontal strength. The bucket base 13 is substantially rigid and is described in further detail below.

A plurality of radial battens or spokes 18 are provided on the bucket 11 to provide rigidity to the bucket 11. The battens or spokes 18 allow the top of the bucket to collapse radially to the diameter of the solid base to allow for storage.

The lines 15 for attaching the bucket 11 to the helicopter will be substantially as known in the art. Typically these can include ropes, harnesses, wire cables or other suitable materials. The bucket 11 in the embodiment shown is suspended from the sling hook by the cables which are attached to eight equally spaced points on the bucket body rim. It will be noted from the Figures that valve stay 16 is attached to the valve and attachable to the aircraft, but is not otherwise attached to the bucket 11. In this embodiment, separate lines, stays or cables 15 are provided for attaching the bucket to the aircraft. This allows for independent relative movement of the bucket with respect to the bucket base.

Figure 2:
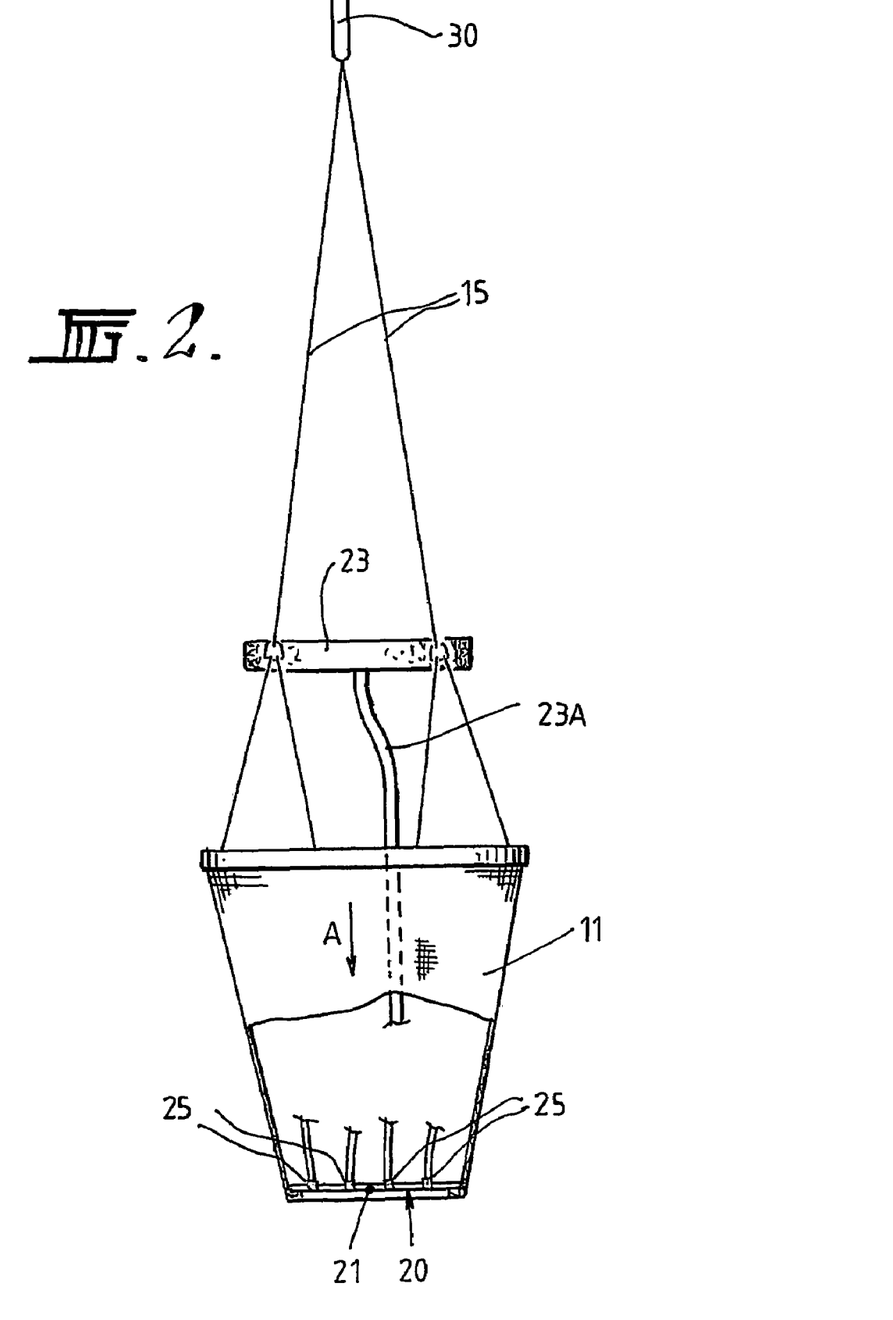
FIG. 2 is a perspective view of the upper portion of a bucket according to one embodiment which illustrates a reservoir for a chemical fire retardant.

Turning to FIG. 2, foam reservoir 23 is mounted externally of the bucket 11. A gravity feed line 23A transfers foam chemical from the reservoir 23 in the direction of the arrow A to the valve 20 via 4 water level controlled flow solenoids 25 and a single flexible plastic line. The solenoid valves are electric and are mounted dose to the centre point 21 of the valve 20. When activated, the solenoid valves allow foam to flow from the foam reservoir 23 to the underside of the valve 20 through a hole in valve 20.

As water streams from the bucket 11, passing through the venturi throat, the low pressure area created from the venturi effect draws foam from the solenoid valves. A water level switch senses when the bucket is 75% empty and restricts the flow of foam from the reservoir. The remaining 25% of water then deans the solenoid valves of foam. As a result of this arrangement, the bucket is not contaminated by foam and therefore will not contaminate dip sites.

Figure 3:
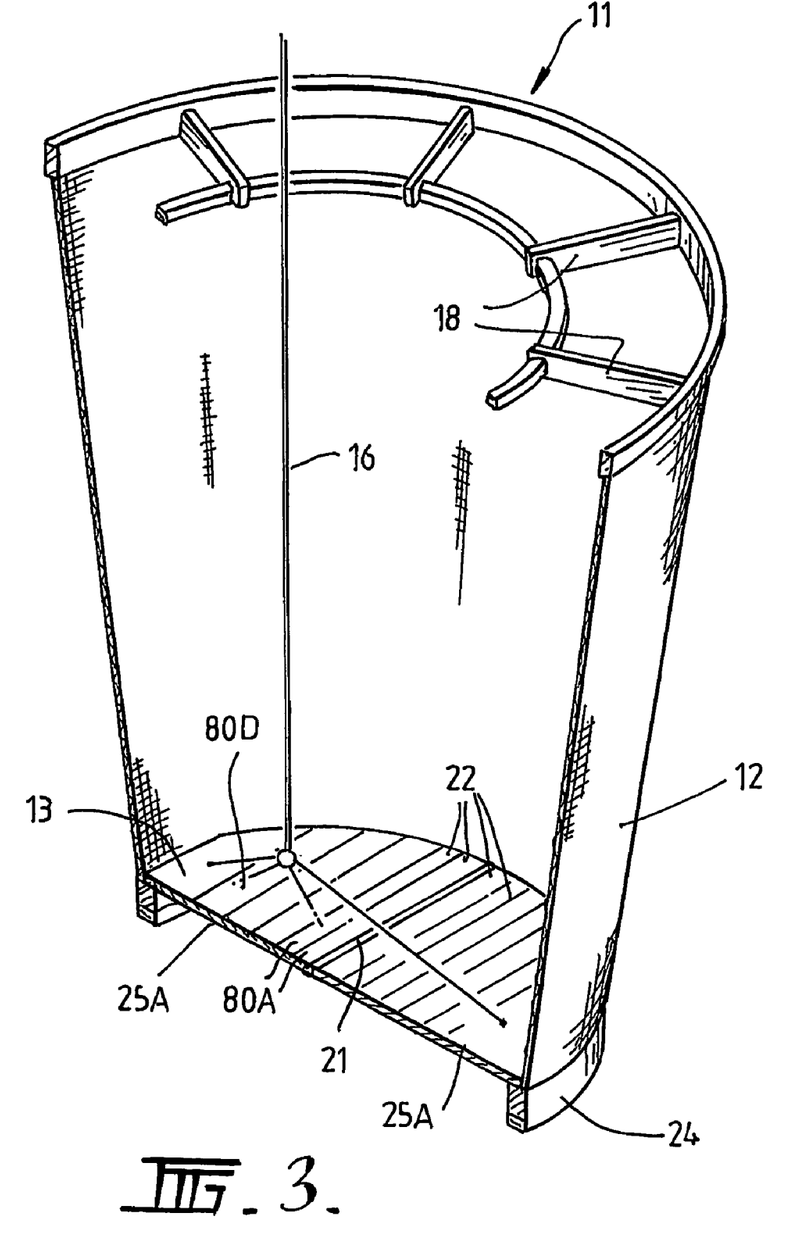
FIG. 3 is a sectional view of the bucket base illustrating a valve according to one embodiment of the invention having a pair of leaves.

As can be seen from FIG. 3, the bucket base 13 includes a central hinged portion 21 with a pair of leaves 25A extend from the hinged portion 21 to the bucket wall 12. The bucket base 13 is formed from a rigid material and in the embodiment shown comprises a polyurethane disc mounted within a zinc plated mild steel frame 24. The polyurethane disc is moulded from 2 polyurethane densities, the first designated 80A which is flexible and the second designated 80D which is rigid. 80A allows easy bending and forms the flexible hinge point 21 for the valve 20. The 80D rigidity provides strength, preventing the valve 20 from pushing through the steel frame when under water pressure. In use when the valve 20 is opened, the leaves flex upwardly at the flexible hinge point 21.

The valve 20 has additional flexible stress points 22 moulded into the polyurethane and parallel with the central hinged potion 21. These areas allow the valve 20 to distort under pressure when the bucket base 13 is in an open state.

Figure 4:
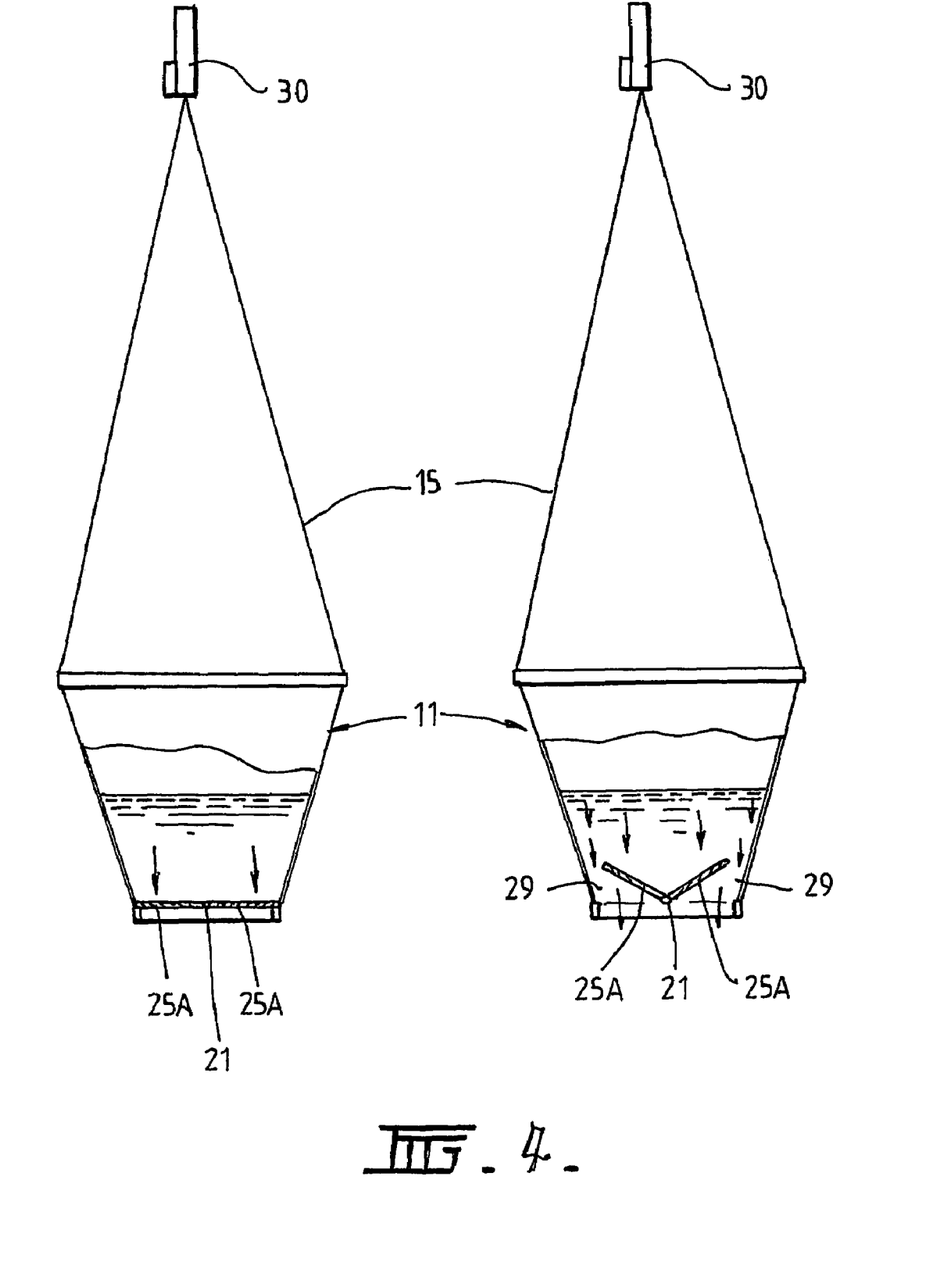
FIG. 4 is a side plan view of the apparatus showing the leaves in the open and the dosed positions.

The opening of the bucket base 13 will now be described with reference to FIGS. 4, 5 and 6. In a filling or transport phase, the bucket base 13 is in the dosed position with the leaves 25A resting against the frame 24 and the bucket lines held in a fixed position relative to one another. To open the bucket base the pilot selects the release valve option 42 (FIG. 6) on an LCD screen 40 provided in the helicopter cockpit. The pilot is also given the option of releasing the entire load or only a partial load of water. Optionally, foam may also be released in a manner described below.

Selection of the release option causes, the bucket lines 15 to be slackened or extended so that the bucket 11 falls relative to the bucket base and the hydraulic cylinder assembly to flex the leaves from the dosed to the open position.

Figure 5:
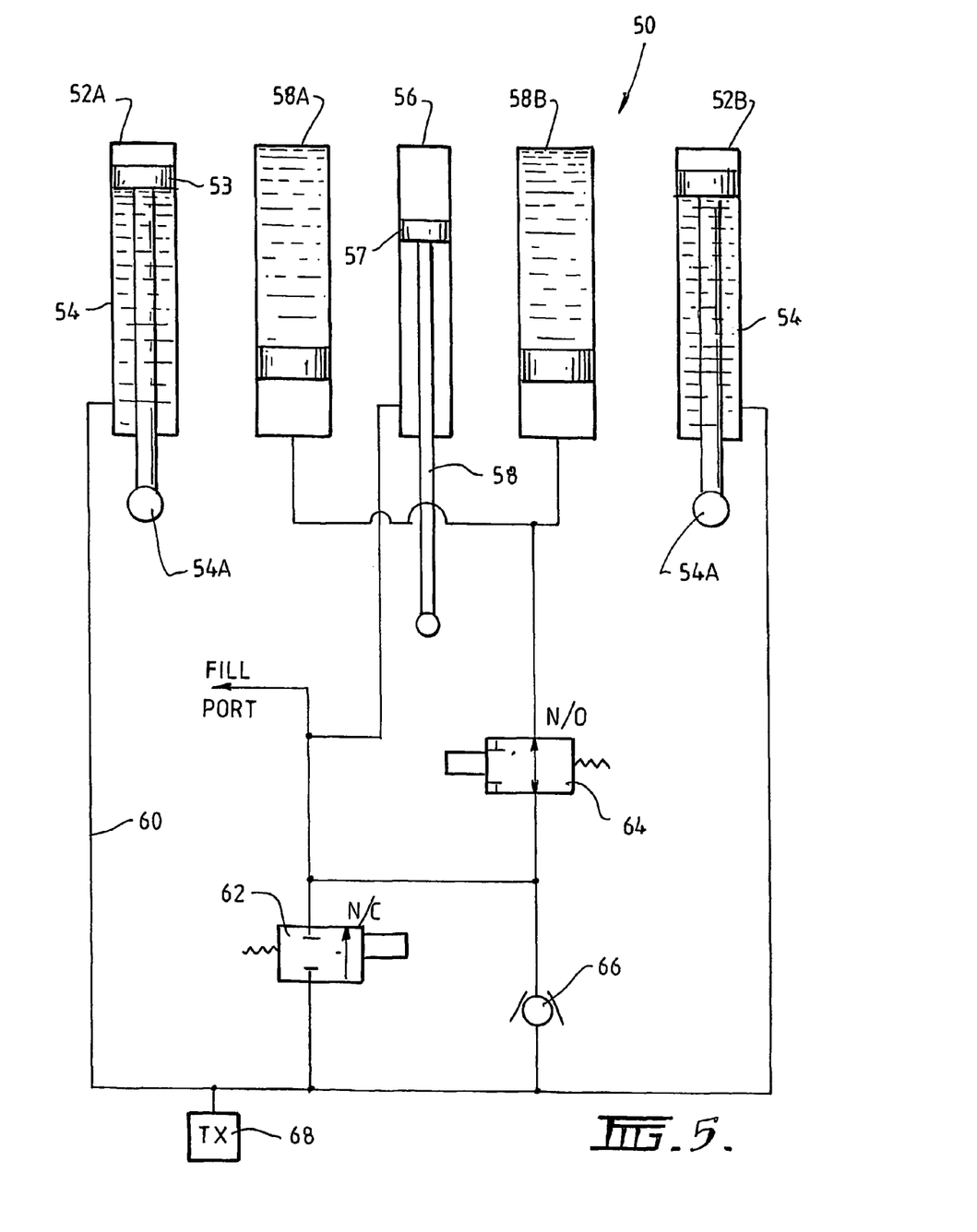
FIG. 5 is a schematic diagram of a typical actuator hydraulic cylinder assembly according to one embodiment of the invention.

Turning to FIG. 5, the hydraulic cylinder assembly 50 includes a pair of weight bearing cylinders 52A & 52B each having a piston 53 and a rod 54 disposed therein. The lower ends of each of the rods 54A is connected to the bucket line, and thereby supports the weight of the bucket 11 when suspended from the aircraft. The hydraulic cylinder assembly 50 further includes a valve opening cylinder 56 having a reduced volume in comparison to the weight bearing cylinder 54. A piston 57 and rod 58 are also disposed in the valve opening cylinder 56 with the lower end of the piston 58 being connected to the bucket base via a second line (not shown). A pair of reset cylinders 58A & 58B also make up the hydraulic cylinder assembly, with lines connecting the cylinders to allow the flow of hydraulic fluid between the cylinders.

The hydraulic valves are driven by a normally dosed solenoid valve 62 coupled to the line 60 exiting from the weight bearing valves 52A & 52 B, and a normally open solenoid valve 64 coupled to the line 60 exiting from the reset valves 58A & 58B. The normally closed valve employs a poppet valve that only allows flow of hydraulic fluid in one direction, whilst the normally open valve employs a spool valve allowing the flow of hydraulic fluid in both directions. A check valve 66 is located between the normally closed valve 62 and the normally open valve 64 for controlling the flow of fluid therebetween.

A transducer 68 is also provided in the actuator casing to measure the pressure of the hydraulic fluid in the weight bearing cylinder 52A. This measurement is used to control the amount of water released during a dump in the manner described below.

Upon the extension of the bucket line, the bucket is allowed to drop a predetermined distance, usually in the order of a few inches, that momentarily reduces the pressure of the hydraulic fluid in the weight bearing cylinders 52A & 52B. Additionally, thee normally closed solenoid valve 62 is energised allowing the transfer of hydraulic fluid through the line 60 from the weight bearing cylinder 52A & 52B into the valve opening cylinder 56. Owing to the smaller volume of the valve opening cylinder, the transferred hydraulic fluid causes the valve to retract upwardly thereby flexing the leaves (see FIG. 4) from the closed to the open position. A gap then 29 forms between the leaves and the bucket wall through which the water flows. The weight of the water which starts to pass through the gap creates an effect approximating a venturi effect in the region between the leaves and the bucket wall.

The hydraulic cylinder assembly is housed in an actuator housing 30 that attaches to the top of the bucket cable supports 15, remote from the wet area of the bucket body. It connects either directly to the helicopter sling or to an extension long line.

It will be noted that the hydraulic cylinder assembly does not require hydraulic pumps, electric motors or bleed air function as with other prior art apparatus. There is also a manual override to release water in the event of electrical failure.

Figure 6:
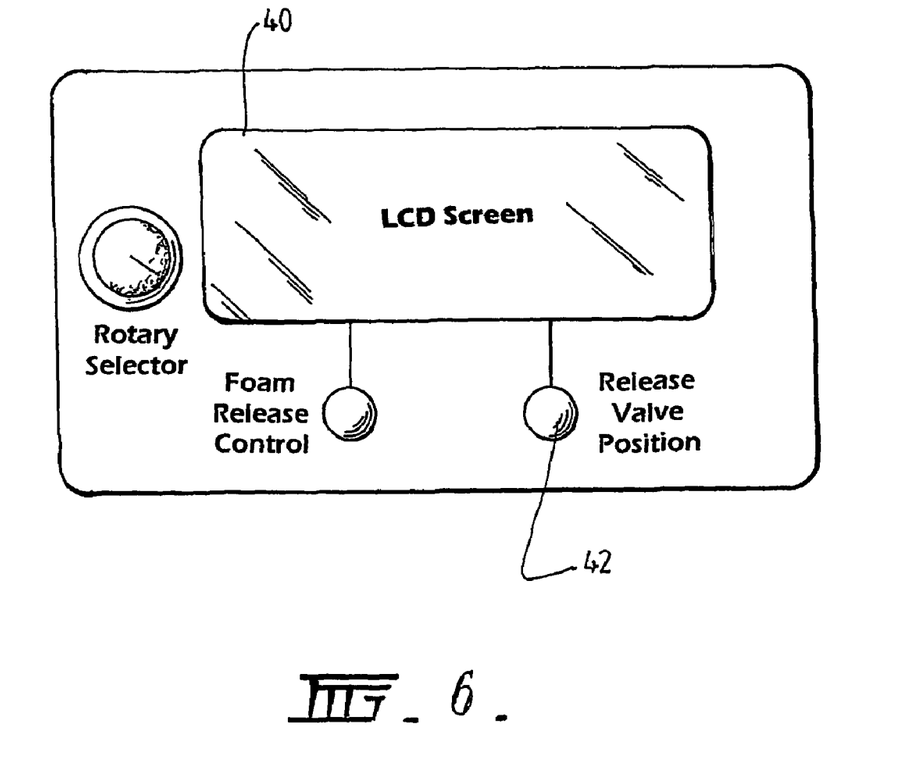
FIG. 6 is a plan view of an LCD screen provided in the aircraft cockpit for opening and dosing the bucket base.

The bucket base is dosed by the pilot operating a control on the LCD screen in the cockpit (FIG. 6). This causes the normally closed solenoid valve 62 and the normally open solenoid valve and the normally closed solenoid valve to deenergise. The weight of the water remaining in the bucket causes the leaves to return to the closed position, thereby pulling the rod in the valve opening cylinder downwardly and the flow of hydraulic fluid (which is blocked by the poppet valve in the normally open cylinder) into the reset cylinders 60A & 60B. The spring loaded reset cylinders 58A & 58B are then used to transfer hydraulic fluid back into the weight bearing cylinders 52A & 52B once the bucket is emptied.

A noted above, the pressure sensitive transducer 68 senses a bucket attribute such as its weight and allows the bucket to be filled automatically by the pilot to a pre-determined volume. The hydraulic pressure in the weight bearing cylinders 52A and 52B. is directly proportional to the weight in the bucket 11. Hydraulic pressure is measured by an electric transducer and passed to a variable voltage regulator and in turn a relay for valve open/valve dosed operation. When hydraulic pressure (and therefore bucket weight) falls below a predetermined level (selected by the pilot) the valve 20 will close, trapping that quantity of weight in the bucket 11.

The bucket body can be fitted with 4×500 lb/230 kg emergency attachment points 17 fitted at the rim 14 of the bucket 11. In an emergency the empty bucket can be used as a transport vehicle to remove cargo from an approaching fire front. Evacuees of a fire can attach a carabina directly to an attachment point 17. Cargo can be carried inside the bucket.

The word 'comprising' and forms of the word 'comprising' as used in this description does not limit the invention claimed to exclude any variants or additions.

Modifications and improvements to the invention will be readily apparent to those skilled in the art. Such modifications and improvements are intended to be within the scope of this invention.

The invention claimed is:

1. A fire fighting apparatus comprising:
   (a) a tapered bucket capable of being suspended from an aircraft, the bucket having a bucket wall, an open upper end to enable the bucket to be filled with a fire retardant and a bucket base comprising a valve having at least one leaflet capable of flexing about a substantially central hinging region; and
   (b) an actuator operable from the aircraft, the actuator including a hydraulic cylinder arrangement for flexing the at least one leaflet about the hinging region between a closed position wherein a periphery of the at least one leaflet makes a sealing contact with the bucket wall and an open position wherein a portion of the at least one leaflet extends upwardly from the hinging region permitting a volume of fire retardant to be discharged through a gap between the at least one leaflet and the bucket wall wherein the hydraulic cylinder arrangement includes:
   a weight bearing cylinder operatively connected to the bucket wall for supporting the weight of the bucket;
   a valve opening cylinder operatively connected to the bucket base for flexing the at least one leaflet, the valve opening cylinder in hydraulic communication with the weight bearing cylinder;
   a recharge cylinder in hydraulic communication with the weight bearing cylinder and valve cylinder for recharging the weight bearing cylinder wherein the cylinder is recharged in response to the weight of fire retardant acting on the at least one leaflet to close the at least one leaflet and discharged in response to un-weighting the tapered bucket;
   a first hydraulic valve in hydraulic communication between the valve opening cylinder and the recharge cylinder; and
   a second hydraulic valve in hydraulic communication between the first hydraulic valve and the recharge cylinder; and,
   a check valve in hydraulic communication between the first and second hydraulic valves and the weight bearing cylinder;
   and wherein
   i) when the tapered bucket is weighted, opening the first hydraulic valve and closing the second hydraulic valve opens the at least one leaflet;

ii) when the tapered bucket is weighted, closing the first hydraulic valve and opening the second hydraulic valve closes the at least one leaflet and recharges the recharge cylinders; and iii) when the tapered bucket is un-weighed, hydraulic fluid flows from the recharge cylinder through the check valve to the weight bearing cylinder to recharge the weight bearing cylinder.

2. A fire fighting apparatus as in claim 1 wherein the actuator includes sensing means to dynamically sense a bucket attribute to enable the bucket to be filled or discharged to a pre-determined volume by the operator.

3. A fire fighting apparatus according to claim 2, wherein the sensing means includes a pressure sensitive transducer that measures the pressure of hydraulic fluid associated with the apparatus, said pressure being directly proportional to the weight of the bucket.

4. A fire fighting apparatus according to claim 3, wherein the sensing means further includes a variable voltage regulator adapted to receive a measurement of pressure from the transducer and control the opening and closing of the valve, the variable voltage regulator closing the valve when the pressure falls below a predetermined level, thereby trapping the proportional weight of fire retardant in the bucket.

5. A fire fighting apparatus according to claim 1, wherein the bucket attribute is the level of fire retardant in the bucket.

6. A fire fighting apparatus according to claim 1, wherein the bucket attribute is the weight of the bucket.

7. A fire fighting apparatus as in claim 1 further comprising a reservoir for a chemical fire retardant, the reservoir having release means which when activated permits the flow of chemical fire retardant to the region of the underside of the valve where it becomes entrained with fire retardant being discharged through the valve.

8. A fire fighting apparatus according to claim 7, wherein the reservoir is located externally of the bucket.

9. A fire fighting apparatus according to claim 7, wherein the reservoir is capable of delivering the chemical fire retardant to the underside of the valve by a gravity feed.

10. A fire fighting apparatus according to claim 7, wherein the release means includes at least one solenoid valve.

11. A fire fighting apparatus according to claim 7, further including a sensor for sensing the level or weight of fire retardant in the bucket.

12. A fire fighting apparatus according to claim 7, wherein the sensor is a pressure sensitive device which causes the valve to close when the weight of the bucket falls below a predetermined level.

13. A fire fighting apparatus according to claim 12, wherein the pressure sensitive device is a transducer.

14. A fire fighting apparatus according to claim 13, wherein the transducer operates to indicate to the operator the volume or level of fire retardant in the bucket.

15. A fire fighting apparatus according to claim 7, further including means for restricting the flow of chemical fire retardant from the reservoir when the bucket has been emptied to a predetermined level.

16. A fire fighting apparatus according to claim 7, wherein the flow of chemical fire retardant from the reservoir is restricted when approximately 75% of the fire retardant has been emptied from the bucket.

17. A fire fighting apparatus according to claim 1, wherein said valve is attachable to the aircraft by at least one remotely actuatable valve line, stay or cable that is not otherwise attached to the bucket, and at least one separate remotely actuatable bucket line, stay or cable that is not otherwise attached to the valve is provided for attaching the bucket to the aircraft, wherein the bucket and the valve are selectively movable relative to one another on independent actuation of the stays to facilitate opening or closing of the valve.

* * * * *